March 26, 1940.    F. NALLINGER    2,194,715

FLUID POWER TRANSMITTER

Filed Feb. 8, 1938

INVENTOR:
FRITZ NALLINGER
BY
ATTORNEYS

Patented Mar. 26, 1940

2,194,715

UNITED STATES PATENT OFFICE 2,194,715

FLUID POWER TRANSMITTER

Fritz Nallinger, Stuttgart, Germany, assignor to Daimler-Benz Aktiengesellschaft, Stuttgart-Unterturkheim, Germany Application February 8, 1938, Serial No. 189,283
In Germany July 22, 1936

10 Claims. (Cl. 60—54)

In the use of fluid power transmitters or couplings employing oil, it has been found that after a short period of operation, the regular outflow of the clutch liquid is impaired or the outlet opening becomes choked or blocked by sludge, resinified oil, particles of asphalt or the like.

The principal object of the present invention is to ensure the regular outflow of the coupling liquid and prevent blockage of the outlet opening, by providing a ring of elevations and depressions which sweep past the opening in the immediate vicinity thereof. The elevations and depressions advantageously have the form of scoops or teeth and may be located on the primary or secondary part of the coupling disposed in a stationary or rotary housing for the coupling parts. Preferably the depressions or elevations are formed by milled cuts in the outer peripheral part of the primary or secondary part which is made of slightly barrel shape.

A further object of the invention is to reduce to a minimum the distance between that coupling part having the outflow openings and the other coupling part with the elevations and depressions. This is advantageously achieved by providing precisely machined projections at the positions of the bores of the outflow openings, while the remaining surface does not require so high a degree of precision in machining.

A further object is to avoid the deposit of particles of dirt in the outflow opening. This object may be achieved by providing openings having a comparatively wide outer cylindrical part and an inner conically shaped part, the narrowest cross-section of which, located at the inner mouth-side determines the amount of the through-flow. The deposition of dirt in the openings is avoided by the formation thereof and by the production of a powerful turbulence and increased thrust in the neighbourhood of these openings, due to the elevations and depressions of the adjacent coupling part sweeping past the openings.

Embodiments of the invention by way of example are illustrated diagrammatically in the drawing, in which.

Figure 1:
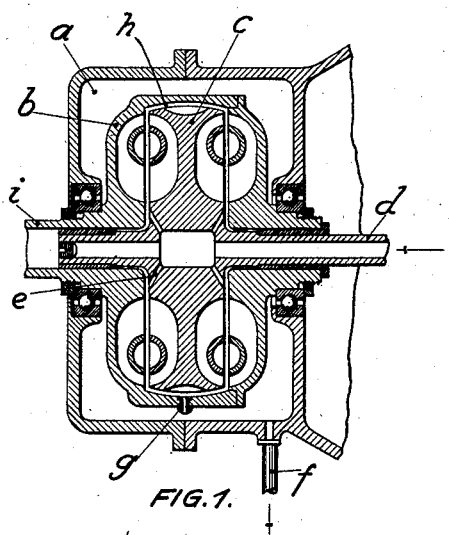
Fig. 1 is a longitudinal cross-sectional view of a fluid transmission formed in accordance with this invention.
Figure 4:
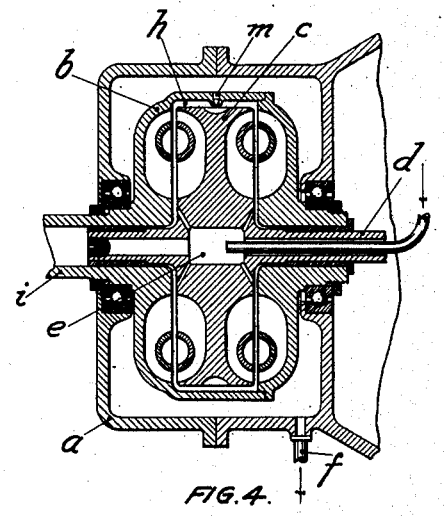
Fig. 4 is a longitudinal cross-sectional view of a modified form of fluid transmission.

The general form of the fluid transmission or coupling according to this invention is illustrated in Figs. 1 and 4 in which two coupling halves $b$ and $c$ rotate in a stationary housing $a$. Of these parts, $c$ may be the driving part and $b$ the driven part. Accordingly, $d$ is the driving shaft and $i$ the driven shaft. The part $c$ forms an impeller for circulating fluid through the driven member $b$. This fluid may enter through the hollow shaft $d$ and bores $e$ and due to the action of centrifugal force will tend to escape from the working circuit formed by the cooperating elements $b$ and $c$. This fluid will be collected within the housing $a$ and from there may go to a suitable sump through a tube $f$. A suitable pump (not shown) is used for supplying the fluid to the coupling.

As illustrated, the two coupling halves $b$ form a double turbine element enclosing a double-vaned impeller $c$. The turbine shell adjacent to the peripherial portion of the impeller is spaced therefrom with a slight clearance so that fluid from the working circuit may flow therebetween and out through the discharge ports to be more particularly described hereinafter.

Figure 2:
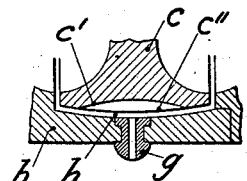
Fig. 2 is a cross-sectional view of certain details of my construction, similar to Fig. 1, but drawn on a larger scale.
Figure 3:
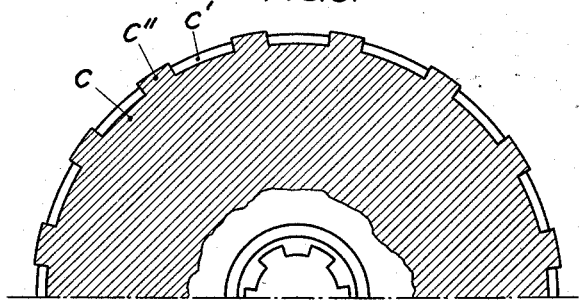
Fig. 3 is a transverse cross-sectional view of the impeller element shown in Figs. 1 and 2 but drawn to a larger scale than Fig. 1.

As shown in Figures 1, 2 and 3, the rotating coupling part $b$ has an outflow nozzle $g$. The contour or surface of the part $c$ opposite to the nozzle $g$ is made slightly barrel shaped and, at equal intervals, is provided with milled cuts $c'$ in such fashion that sharp-edged elevations $c''$ like teeth or scoops are formed. The clearance $h$ between the barrel-shaped surface of the part $c$ and the opposite wall of the part $b$ is as small as is practically possible.

Figures 5, 6:
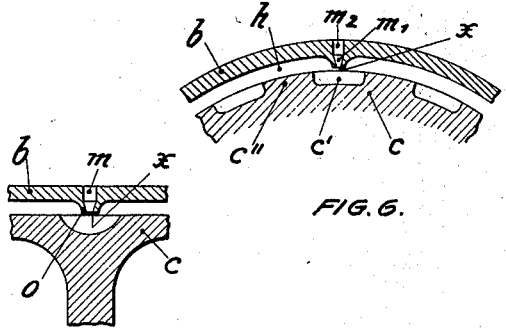
Fig. 5 is a cross-sectional view of certain details of the construction illustrated in Fig. 4 but drawn on a larger scale.
Fig. 6 is a transverse cross-sectional view of part of the impeller and turbine elements shown in Figs. 4 and 5 but drawn to a larger scale than Fig. 4.

In accordance with Figures 4, 5 and 6, the rotating coupling part $b$ possesses, outflow bores $m$ in a projection $o$ which sweeps past the part $c$ with the minimum possible gap $x$. The outflow bore $m$ consists of a conically shaped part $m_1$, whose narrowest cross section, determining the amount of the through flow, is located at the inner mouth-side end which flares outwardly, and an outer comparatively wide cylindrical part $m_2$.

The manner in which the arrangements according to the above described invention operates is as follows: when the element c begins to rotate relative to the part b, a working circuit of the fluid is formed and the part b tends to rotate along with the part c. Due to centrifugal force, a portion of the fluid is discharged from the working circuit and flows outwardly from the nozzles or ports g or m into the stationary housing a. The depressions or scoops on the periphery of the part c rotating within the shell of the part b produces a turbulence within the clearance space h or x between these elements, resulting in a powerful pulsating flow of fluid in this narrow space. As a result of the pressure due to this flow, oil sludge or other dirt, which might accumulate in the spaces h or x or the outflow ports g or m, cannot collect and thereby cause stoppage of the ports. A small continuous circulation of the fluid is therefore assured.

Within the scope of the invention, it is immaterial whether the part c turns and the part b is stationary, or conversely the part b rotates in relation to the stationary part c, or both parts c and b rotate at different speeds of revolution. Furthermore, I do not intend that this invention be limited to the precise formation of depressions, bores, and scoops illustrated, but as covering all equivalent means as defined by the claims which follow.

I claim:

1. A fluid transmission for interconnecting a load and a source of power, a double turbine element connected to the load and having a periphery formed with a plurality of spaced depressions, a double impeller element connected to the source of power and cooperating with said turbine element to form a working circuit for the fluid, said turbine element having a connecting shell portion slightly spaced from and surrounding the periphery of said double impeller element, said shell being formed with a plurality of openings cooperating with the depressions in the periphery of said impeller element to insure a positive discharge of fluid from the working circuit.

2. The combination according to claim 1 in which the openings in the shell are formed as discharge nozzles.

3. The combination according to claim 1 in which the openings in the shell are formed as throttle bores.

4. The combination according to claim 1 in which the periphery of the double impeller element has a plurality of elevations at the edges of the depressions.

5. The combination according to claim 1 in which the depressions on the periphery of the double impeller element are formed as scoops having a sharp toothed edge in the direction of rotation of the impeller element.

6. The combination according to claim 1 in which the shell is formed with inwardly directed portions at its openings, thereby extending said openings inwardly for close cooperation with the depressions in the periphery of said double impeller element.

7. A fluid transmission for interconnecting a load and a source of power, a double impeller element connected to the source of power, and having a periphery formed with a plurality of spaced scoops and sharp teeth between these scoops, a double turbine element connected to the load and cooperating with said turbine element to form a working circuit, said double turbine element having an annular connecting shell portion slightly spaced from and surrounding the periphery of said double impeller element, said shell being formed with one or more bores cooperating with the scoops and teeth on the periphery of said double impeller element to insure a restricted positive discharge of fluid from the working circuit.

8. The combination according to claim 1, in combination with a stationary housing surrounding and rotatably supporting said turbine and impeller elements, and means for removing the discharged oil from said housing.

9. The combination according to claim 7, in combination with a stationary housing surrounding and rotatably supporting said turbine and impeller elements, and means for removing the discharged oil from said housing.

10. The combination according to claim 7 in which the bores have inner conical mouths directed toward the periphery of the double impeller element and outer cylindrical mouths leading from the shell.

FRITZ NALLINGER.